United States Patent
Park et al.

(10) Patent No.: US 12,522,741 B2
(45) Date of Patent: Jan. 13, 2026

(54) INFRARED PERMEABLE INK COMPOSITION, OPTICAL FILTER FORMED THEREBY, AND ELECTRONIC APPARATUS INCLUDING THE OPTICAL FILTER

(71) Applicants: SAMSUNG DISPLAY CO., LTD., Yongin-si (KR); NOKWON C&I CORP., Paju-si (KR)

(72) Inventors: Youngok Park, Yongin-si (KR); Kihun Kim, Paju-si (KR); Myungseok Kwon, Yongin-si (KR); Jonghwan Bae, Paju-si (KR); Minwoo Oh, Paju-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 421 days.

(21) Appl. No.: 18/107,868

(22) Filed: Feb. 9, 2023

(65) Prior Publication Data
US 2023/0257609 A1    Aug. 17, 2023

(30) Foreign Application Priority Data
Feb. 15, 2022   (KR) .......................... 10-2022-0019789

(51) Int. Cl.
*C09D 11/38* (2014.01)
*B41J 2/14* (2006.01)
*C09D 11/328* (2014.01)
*G02B 5/20* (2006.01)

(52) U.S. Cl.
CPC ................ *C09D 11/38* (2013.01); *B41J 2/14* (2013.01); *C09D 11/328* (2013.01); *G02B 5/208* (2013.01); *B41J 2002/14354* (2013.01)

(58) Field of Classification Search
CPC ................ B41J 2/14; B41J 2002/14354; B41J 2002/012; C09D 11/38; C09D 11/328; C09D 11/102; C09D 11/03; C09D 11/033; C09D 11/037; G02B 5/281; G02B 5/208; G02B 5/223
See application file for complete search history.

(56) References Cited

U.S. PATENT DOCUMENTS 6,610,136 B2   8/2003   Malla et al.
9,139,745 B2   9/2015   Izu et al.
10,407,579 B2  9/2019   Yamanaka et al.
(Continued)

FOREIGN PATENT DOCUMENTS

CN        106200270 A      12/2016
KR     1020170034761 A      3/2017
KR     1020210060674 A      5/2021

OTHER PUBLICATIONS

Anshuman Gaur; "What is a Sensor? Different Types ofSensors in a smartphone"; /home/u577574358/domains/geekrepublics.com/public_html/wp-content/themes/neve/neve.template#templateon line 43; GeekRepublics; Mar. 28, 2020; pp. 1-16.
(Continued)

*Primary Examiner* — Thinh H Nguyen
(74) *Attorney, Agent, or Firm* — CANTOR COLBURN LLP

(57) ABSTRACT

An infrared permeable ink composition includes an epoxy resin, a curing agent, and a dye, where surface roughness of an optical filter formed by curing the infrared permeable ink composition is equal to or less than about 10 nm.

20 Claims, 4 Drawing Sheets

(56) References Cited

U.S. PATENT DOCUMENTS

| | | |
|---|---|---|
| 11,118,077 B2 | 9/2021 | Yoo et al. |
| 2003/0019399 A1 | 1/2003 | Malla et al. |
| 2010/0163812 A1* | 7/2010 | Kim .................. C08K 5/34922 |
| | | 252/586 |
| 2012/0142808 A1 | 6/2012 | Izu et al. |
| 2017/0068027 A1* | 3/2017 | Powell .................... B29C 41/20 |
| 2018/0327617 A1* | 11/2018 | Inoue .................. C09D 11/106 |

OTHER PUBLICATIONS

Isao Ichikawa, et al; "Quantitative analysis of the phase-separated structure and mechanical properties of acrylic copolymer/epoxy thermosetting resin composites"; POlymer Journal (2015) 47; pp. 779-788.

Saeid Nikafsharet al; "The Effects of UV Light on the Chemical and Mechanical Properties of a Transparent Epoxy-Diamine System in the Presence of an Organic UV Absorber"; Materials 2017, 10, 180; pp. 2-18.

\* cited by examiner

INFRARED PERMEABLE INK COMPOSITION, OPTICAL FILTER FORMED THEREBY, AND ELECTRONIC APPARATUS INCLUDING THE OPTICAL FILTER

This application claims priority to Korean Patent Application No. 10-2022-0019789, filed on Feb. 15, 2022, and all the benefits accruing therefrom under 35 U.S.C. § 119, the content of which in its entirety is herein incorporated by reference.

BACKGROUND

1. Field

One or more embodiments include an infrared permeable ink composition, an optical filter formed therefrom, and an electronic apparatus including the optical filter.

2. Description of the Related Art

A proximity sensor in an electronic apparatus may be used to detect the presence of an object. In a case where an electronic apparatus is a mobile phone, a distance between the mobile phone and an object may be measured by using an infrared light-emitting apparatus and an infrared optical sensor.

When the mobile phone is placed close to an ear of the head of a user to make a call, the infrared light-emitting apparatus and the infrared optical sensor may measure the distance between the mobile phone and the ear of the head. Then, a proximity sensor may detect the presence of the head, and a display of the mobile phone may be turned off, such that accidental screen touches may be prevented, and a battery lifespan may be extended.

In an electronic apparatus (e.g., a mobile phone), a layer that transmits infrared rays may be arranged between a proximity sensor and a glass cover.

SUMMARY

One or more embodiments provide an infrared permeable ink composition, an optical filter formed by curing the infrared permeable ink composition, and an electronic apparatus including the optical filter.

According to one or more embodiments, an infrared permeable ink composition includes an epoxy resin, a curing agent, and a dye.

In such embodiments, a surface roughness of an optical filter formed by curing the ink composition is equal to or less than about 10 nanometers (nm).

According to one or more embodiments, an optical filter formed by curing the infrared permeable ink composition is provided.

According to one or more embodiments, an electronic apparatus including an optical filter formed by curing the infrared permeable ink composition is provided.

BRIEF DESCRIPTION OF THE DRAWINGS

The above and other features of certain embodiments of the disclosure will be more apparent from the following description taken in conjunction with the accompanying drawings, in which.

DETAILED DESCRIPTION

Figure 1:
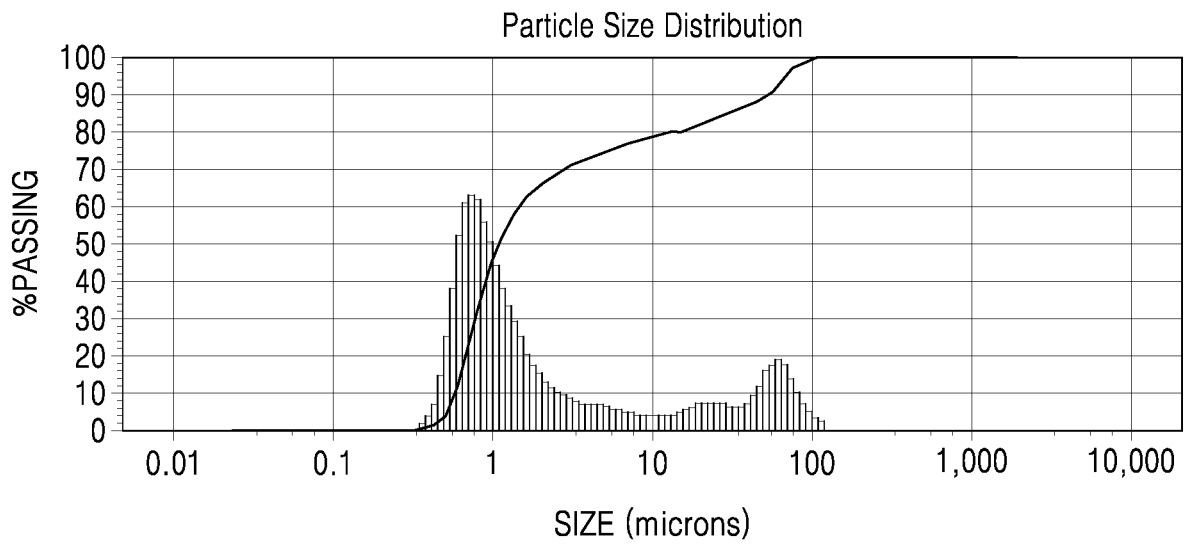
FIG. 1 is a graph showing particle size distribution of an infrared permeable ink composition according to the prior art.
Figure 2:
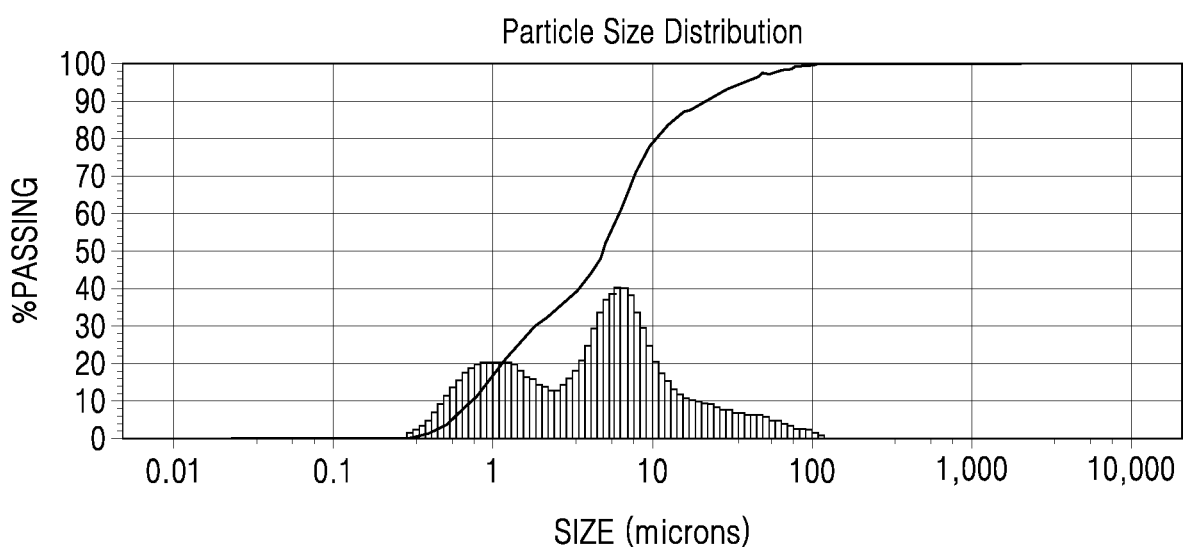
FIG. 2 is a graph showing particle size distribution of another infrared permeable ink composition according to the prior art.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. Throughout the disclosure, the expression "at least one of a, b or c" or "at least one selected from a, b and c" indicates only a, only b, only c, both a and b, both a and c, both b and c, all of a, b, and c, or variations thereof.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Unlike general ink, an infrared permeable ink not only implements color, but also transmits and absorbs light at a specific wavelength band, so as not to affect the function of an infrared sensor. By color-matching with a substrate, the infrared permeable ink is used to allow a device not to be exposed to the bottom surface.

When a cover glass of an electronic device (e.g., a mobile phone) is reworked, a process of cleaning the cover glass with alcohol is performed to re-use a removed cover glass. Here, when a layer formed of the infrared permeable ink composition on the cover glass is melted, it may lead to a defect in a product.

Accordingly, a method of forming an additional layer with clean ink on the layer formed of the infrared permeable ink composition on the cover glass may be provided to prevent the layer formed of the infrared permeable ink composition from melting by the cleaning alcohol.

However, forming an additional layer with clean ink on the layer formed of the infrared permeable ink composition on the cover glass may cause an increase in cost and a low yield.

An embodiment of the disclosure provides an infrared permeable ink composition including an epoxy resin, a curing agent, and a dye.

In such an embodiment, a surface roughness of an optical filter formed by curing the ink composition may be equal to or less than about 10 nanometers (nm).

As a result of numerous repeated experiments, the inventors of the disclosure found that, when the surface roughness of the optical filter obtained by curing the infrared permeable ink composition according to an embodiment of the disclosure is equal to or less than about 10 nm, the physical properties of the optical filter (e.g., ethanol robustness, picking properties, tensile strength, etc.) increased.

The epoxy resin may refer to a resin including an epoxy moiety.

In embodiments of the invention, the epoxy resin of the infrared permeable ink composition may have a molecular weight in a range of about 100 to about 10,000. In an embodiment, for example, the epoxy resin may have a molecular weight in a range of about 300 to about 5,000. In an embodiment, for example, the epoxy resin may have a molecular weight in a range of about 500 to about 1,000. The molecular weight may refer to a weight average molecular weight. When the molecular weight of the epoxy resin is less than 100, viscosity may be low in terms of the ink composition, and when the molecular weight of the epoxy resin exceeds 10,000, viscosity may be so high in terms of the ink composition that discharging may be difficult.

In an embodiment, the epoxy resin may be a bisphenol A-based epoxy resin.

The bisphenol A-based epoxy resin refers to a resin including a bisphenol A moiety and an epoxy moiety. In an embodiment, a commonly used (or commercially available) bisphenol A-based epoxy resin may be used as the bisphenol A-based epoxy resin.

In an embodiment, a resin in a solution state dissolved in a solvent (e.g., example, DB acetate) may be used as the bisphenol A-based epoxy resin. Regarding a concentration of the bisphenol A-based epoxy resin in the solution state, an amount of the bisphenol A-based epoxy resin may be in a range of about 20 weight percent (wt %) to about 80 wt % based on 100 wt % of the total resin in the solution state. In an embodiment, for example, the amount of the bisphenol A-based epoxy resin may be in a range of about 40 wt % to about 60 wt %. The bisphenol A-based epoxy resin in the solution state may have viscosity in a range of about 8,000 centipoise (cP) to about 18,000 cP. In an embodiment, for example, the bisphenol A-based epoxy resin in such a solution state may have viscosity in a range of about 10,000 cP to about 15,000 cP.

In an embodiment, the dye of the infrared permeable ink composition may include an azo dye, an imidazole dye, an acridine dye, or a combination thereof.

The dye may be, for example, black or bluish color. The azo dye may be black or bluish color, and may refer to a dye including an azo group. The imidazole dye may be black or bluish color, and may refer to a dye including an imidazole group. The acridine dye may be black or bluish color, and may refer to a dye including an acridine group. In an embodiment, commonly used azo dye, imidazole dye, or acridine dyes may be used as the dye of the infrared permeable ink composition.

In an embodiment, in the measurement of particle distribution of the composition by using a tri-laser system of Microtrac, the number of particles having a particle size in a range of about 0.05 micrometers (μm) to about 1 μm may be equal to or greater than 50% of the total number of the particles.

The tri-laser system of Microtrac is operated by Microtrac company, and is a technology that is able to detect even particles in tens of nanozones by arranging three semiconductor lasers at each angle. More detailed information may be referred to the website of the Microtract company.

Among the total particles in the infrared permeable ink composition (for example, the total particles having a particle size in a range of about 0.01 μm to about 10,000 μm), when the number of particles having a particle size in a range of about 0.05 μm to about 1 μm is equal to or greater than 50% of the total number of the particles, a layer formed by curing the infrared permeable ink composition may have surface roughness of equal to or less than 10 nm and have desired physical properties.

For example, the infrared permeable ink is not melded out from the layer formed by curing the infrared permeable ink composition described above, even when rubbing 10 times by applying a load of 1 kg to a lint-free wiper containing 99.8% of ethanol.

In addition, the layer formed by curing the infrared permeable ink composition may have high tensile strength.

For example, among the total particles in the infrared permeable ink composition, when the number of particles having a particle size in a range of about 0.05 μm to about 1 μm is less than 50% of the total number of the particles, for example, when there are no particles at all having a particle size in a range of about 0.05 μm to about 1 μm or when the number of particles having a particle size in a range of about 0.05 μm to about 1 μm is between 10% and 30% of the total number of the particles, the infrared permeable ink is melted out from the layer formed by curing the infrared permeable ink composition in case of rubbing 10 times by applying a load of 1 kg to a lint-free wiper containing 99.8% of ethanol. In addition, the layer formed by curing the infrared permeable ink composition described above may have relatively low tensile strength.

In an embodiment, the curing agent of the infrared permeable ink composition may be a blocked isocyanate resin.

In an embodiment, the curing agent may include methylene phenyl diisocyanate, polymeric methylene phenyl diisocyanate, tolylene diisocyanate, lysine diisocyanate, hexamethylen diisocyanate, xylylene diisocyanate, 2,4,6-triisopropyl phenyldiisocyanate, isophorone diisocyanate, 4,4'-dichlohexylmethane diisocyanate, or a combination thereof.

In an embodiment, the infrared permeable ink composition may further include a curing accelerator. The curing accelerator may be a compound that acts to accelerate curing.

In an embodiment, the curing accelerator may be an imidazole-based compound, and for example, may include 2MZ, 1.2DMZ, 2EM4Z, 2PZ, 1B2MZ, 2P4MZ, C11Z, C17Z, C11Z-A, 2MZ-A, or a combination thereof. These examples are product names of the imidazole-based compound, and may be purchased from, for example, Shikoku Chemicals Corporation.

In an embodiment, the infrared permeable ink composition may further include an adhesion promoter, and the adhesion promoter may be, for example, an amino-based silane compound.

In an embodiment, the adhesion promoter may be aminoethyl aminopropyl triethoxysilane, n-phenylaminopropyltrimethoxysilane, trimethoxysilylpropyl diethylene triamine, 3-(3-aminophenoxy)propyl trimethoxysilane, aminoethyl aminomethyl phenyltrimethoxysilane, 2-aminoethyl-3-aminopropylsilane, tris-2-ethylhex oxysilane, n-aminohexyl aminopropyl trimethoxysilane, or a combination thereof.

In an embodiment, the infrared permeable ink composition may further include a pigment, an antifoaming agent, a leveling agent, a dispersant, a solvent, or a combination thereof.

The pigment may be a black, white, red, yellow, blue, magenta, violet, green, orange, indigo, or scarlet pigment, and may include particles having a particle size in a range of about 1 μm to about 10 μm.

In an embodiment, commonly used materials, for example, products of BASF company, BYK company, and EVONIC company may be used as the antifoaming agent, the leveling agent, the dispersant, and the like.

In an embodiment, an amount of the dye may be in a range of about 5 parts by weight to about 30 parts by weight based on 100 parts by weight of the epoxy resin.

In an embodiment, an amount of the curing agent may be in a range of about 10 parts by weight to about 70 parts by weight based on 100 parts by weight of the epoxy resin.

In an embodiment, an amount of the adhesion promoter may be in a range of about 5 parts by weight to about 30 parts by weight based on 100 parts by weight of the epoxy resin.

In an embodiment, an amount of the curing accelerator may be in a range of about 5 parts by weight to about 30 parts by weight based on 100 parts by weight of the epoxy resin.

In an embodiment, an amount of the pigment may be in a range of about 5 parts by weight to about 30 parts by weight based on 100 parts by weight of the epoxy resin.

In an embodiment, amounts of the antifoaming agent, the leveling agent, the dispersant, and the like may each independently be in a range of about 0.1 part by weight to about 10 parts by weight based on 100 parts by weight of the epoxy resin.

In an embodiment, the infrared permeable ink composition may optionally include a solvent to have appropriate viscosity. The solvent may be, for example, an organic solvent. In an embodiment, for example, the solvent may be toluene.

Another embodiment of the disclosure provides an optical filter formed by curing the infrared permeable ink composition.

The infrared permeable ink composition may include a curing agent, and thus may be cured and form a layer.

In an embodiment, for example, the infrared permeable ink composition may be photocured by ultraviolet (UV) light or thermally cured at a temperature in a range of about 110° C. to about 170° C.

In an embodiment, the optical filter may have transmittance of equal to or less than 1% at 550 nm and equal to or greater than 85% at 940 nm. When the transmittance at 550 nm exceeds 1%, a malfunction of the proximity sensor may occur. When the transmittance at 940 nm is less than 85%, infrared rays reaching the proximity sensor may be insufficient, and thus may a malfunction of the proximity sensor may occur.

In an embodiment, the optical filter may have surface roughness of equal to or less than about 10 nm.

When the surface roughness of the optical filter exceeds about 10 nm, the optical filter may have undesired physical properties (e.g., ethanol robustness, picking properties, tensile strength, etc.).

Another embodiment of the disclosure provides an electronic apparatus including the optical filter formed by curing the infrared permeable ink composition.

In an embodiment, the electronic apparatus may further include a proximity sensor, and the optical filter may be arranged on the proximity sensor. In an embodiment, a cover glass may be arranged on the optical filter. In an embodiment, for example, the electronic apparatus may have a cover glass/optical filter/proximity sensor structure.

Conventional infrared permeable ink, which has been commonly used in the art, generally uses dyes to develop a film capable of implementing transmittance and absorptance. However, dispersibility and physical properties of a film may not be desired when the film is formed only by stirring or primary milling.

In embodiments of the disclosure, a secondary milling process is introduced to improve the dispersibility of the particles for the improvement of agglomeration.

Another embodiment of the disclosure provides a method of preparing the infrared permeable ink composition.

In an embodiment, the method includes: mixing an epoxy resin and a dye (hereinafter, a first process); and adding and mixing a curing agent with the mixture of the epoxy resin and the dye (hereinafter, a second process).

In an embodiment, the first process may be performed by a milling process. For example, a 3-roll-mill may be used at a pressure in a range of about 30 newton ON to about 60 N at a rotation rate in a range of about 400 rounds per minute (rpm) to about 600 rpm. The first process may be performed, for example, at a room temperature (e.g., a temperature in a range of in a range of about 15° C. to about 25° C., or in a range of about 20° C. to about 25° C.).

In the first process, for example, an adhesion promoter, a pigment, an antifoaming agent, a leveling agent, a dispersant, a solvent, or a combination thereof may be further added.

In an embodiment, the second process may be performed by a bead-milling process. In an embodiment, for example, the second process may be performed by using alumina beads, zirconia beads, titania beads, steel beads, yittria-stabilized zirconia (YSZ) beads, or a combination thereof.

In the second process, for example, a curing accelerator may be further added.

The second process may be performed, for example, at an isothermal temperature in a range of about 20° C. to about 40° C.

During the second process, the infrared permeable ink composition becomes a highly dispersed ink composition in which aggregation is suppressed.

Hereinafter, the infrared permeable ink composition according to embodiments of the disclosure will be described in detail with reference to Examples.

EXAMPLES

Preparation of Infrared Permeable Ink Composition

Comparative Example 1

At a room temperature, 100 wt % of an epoxy resin, 15 wt % of an azo black dye, 10 wt % of aminoethyl aminopropyl triethoxysilane, 15 wt % of a black pigment (particle diameter: 1 μm to 10 μm), 40 wt % of methylenephenyl diisocyanate, and 10 wt % of 2MZ were added to a 3-roll-mill, and then mixed for 30 minutes at a pressure of 50 N and a rotation rate of 500 rpm to form an infrared permeable ink composition.

Here, the epoxy resin was a bisphenol A-based epoxy resin and had a molecular weight in a range of about 500 to about 600 and viscosity in a range of about 10,000 cP to about 15,000 cP. The epoxy resin was dissolved in Solvent DB acetate (CAS: 12-17-4), and a solid amount thereof was in a range of about 40 wt % to about 60 wt %.

Comparative Example 2

An infrared permeable ink composition was prepared in the same manner as in Comparative Example 1, except that an imidazole black dye was used instead of the azo black dye.

Comparative Example 3

An infrared permeable ink composition was prepared in the same manner as in Comparative Example 1, except that an acridine black dye was used instead of the azo black dye.

Comparative Example 4

An infrared permeable ink composition was prepared in the same manner as in Comparative Example 1, except that hydroxypivalic acid neopentyl glycol diacrylate (viscosity: 11,000 cP to 15000 cP/solvent: DB acetate/solid amount: 45 wt % to 65 wt %) which is an acrylic-based resin was used instead of the bisphenol A-based epoxy resin and that a perylene black dye was used instead of the azo black dye.

Example 1

As a first mixing process, at a room temperature, 100 wt % of an epoxy resin, 15 wt % of an azo black dye, 10 wt % of aminoethyl aminopropyl triethoxysilane, and 15 wt % of a black pigment (particle diameter: 1 μm to 10 μm) were added to a 3-roll-mill, and then mixed for 30 minutes at a pressure of 50 N and a rotation rate of 500 rpm.

Next, as a second mixing process, 40 wt % of methylenephenyl diisocyanate and 10 wt % of 2MZ were added to the mixture of the first mixing process and mixed by a bead process for 30 minutes using alumina beads (diameter: 3 mm) at an isothermal temperature of 30° C., thereby preparing an infrared permeable ink composition.

Here, the epoxy resin was a bisphenol A-based epoxy resin and had a molecular weight in a range of about 500 to about 600 and viscosity in a range of about 10,000 cP to about 15,000 cP. The epoxy resin was dissolved in Solvent DB acetate (CAS: 12-17-4), and a solid amount thereof was in a range of about 40 wt % to about 60 wt %.

Example 2

An infrared permeable ink composition was prepared in the same manner as in Example 1, except that an imidazole black dye was used instead of the azo black dye.

Example 3

An infrared permeable ink composition was prepared in the same manner as in Example 1, except that an acridine black dye was used instead of the azo black dye.

Measurement of Particle Size

After printing on a glass film to a thickness of 3 μm by inkjet using the infrared permeable ink compositions prepared in Comparative Examples 1 to 4 and Examples 1 to 3, the particle distribution was measured with a tri-laser system of Microtrac, and results thereof were shown in a graph.

Figure 5:
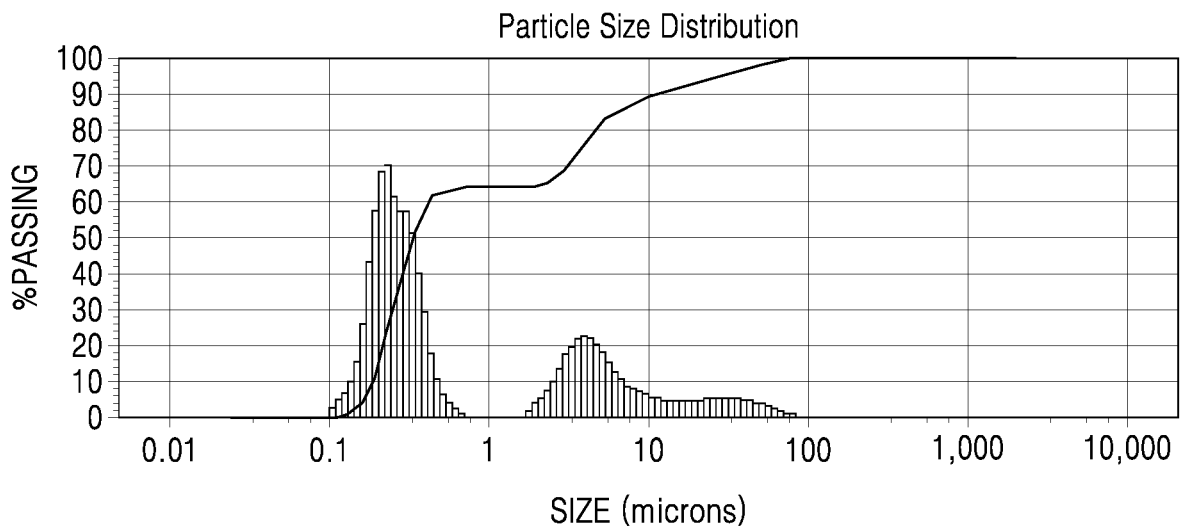
FIG. 5 is a graph showing particle size distribution of an infrared permeable ink composition according an embodiment.
Figure 6:
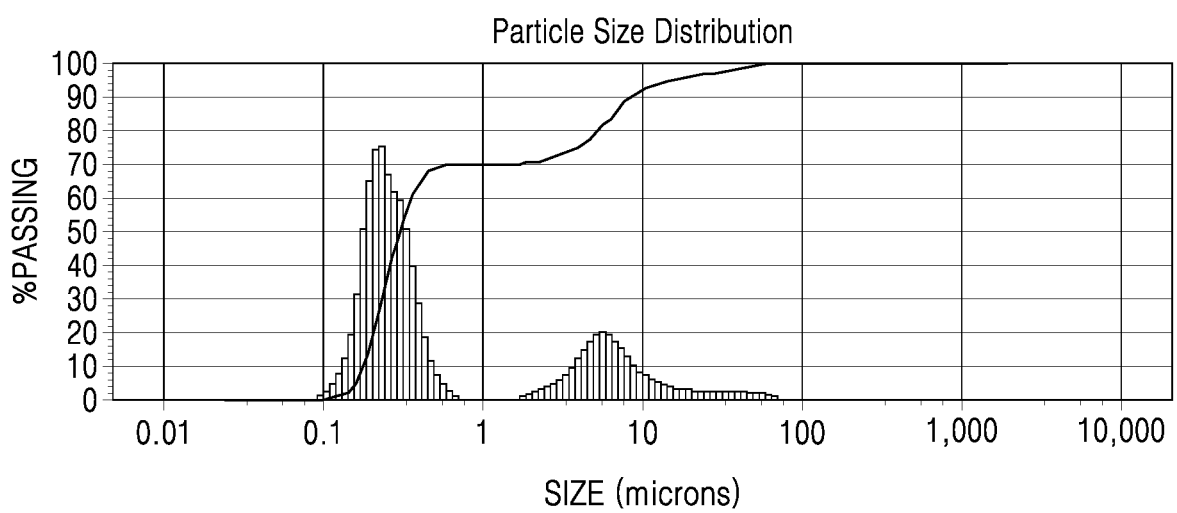
FIG. 6 is a graph showing particle size distribution of an infrared permeable ink composition according another embodiment.
Figure 7:
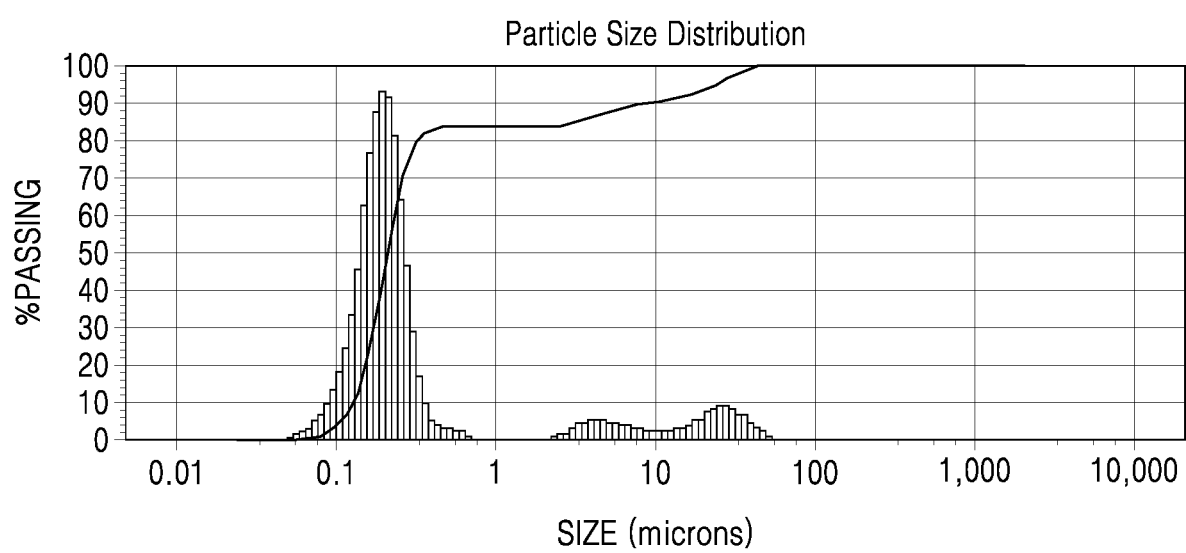
FIG. 7 is a graph showing particle size distribution of an infrared permeable ink composition according another embodiment.

FIGS. 1 to 4 are each a graph showing the particle distribution of the infrared permeable ink composition of each of Comparative Examples 1 to 4, and FIGS. 5 to 7 are each a graph showing the particle distribution of the infrared permeable ink composition of each of Examples 1 to 3.

Referring to FIGS. 1 to 4, it was confirmed that the number of particles having a particle size in a range of about 0.05 μm to about 1 μm in the particle distribution of the infrared permeable ink composition of each of Comparative Examples 1 to 4 did not reach 50% of the total number of the particles.

Figure 3:
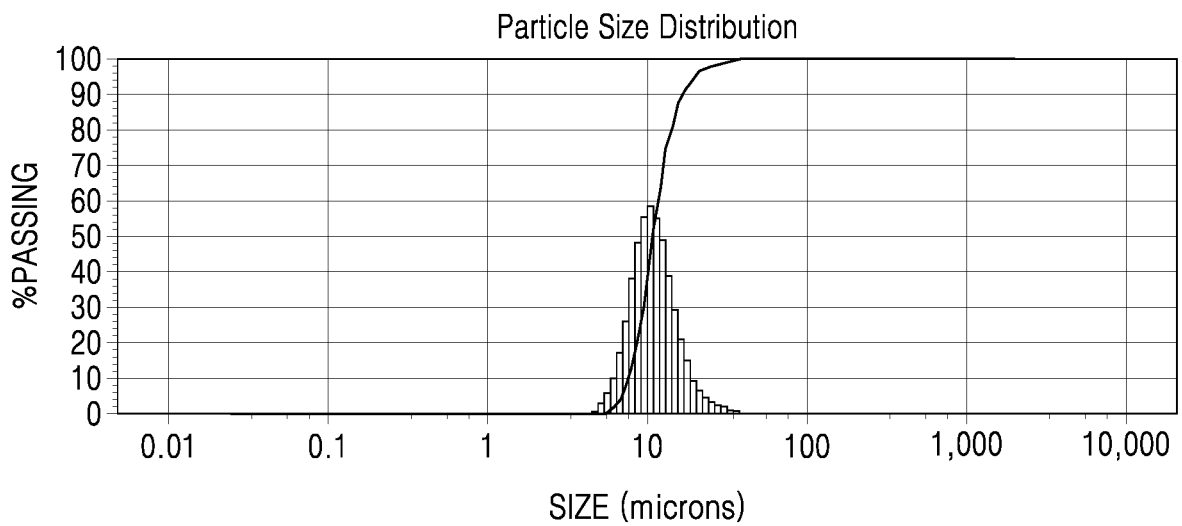
FIG. 3 is a graph showing particle size distribution of another infrared permeable ink composition according to the prior art.
Figure 4:
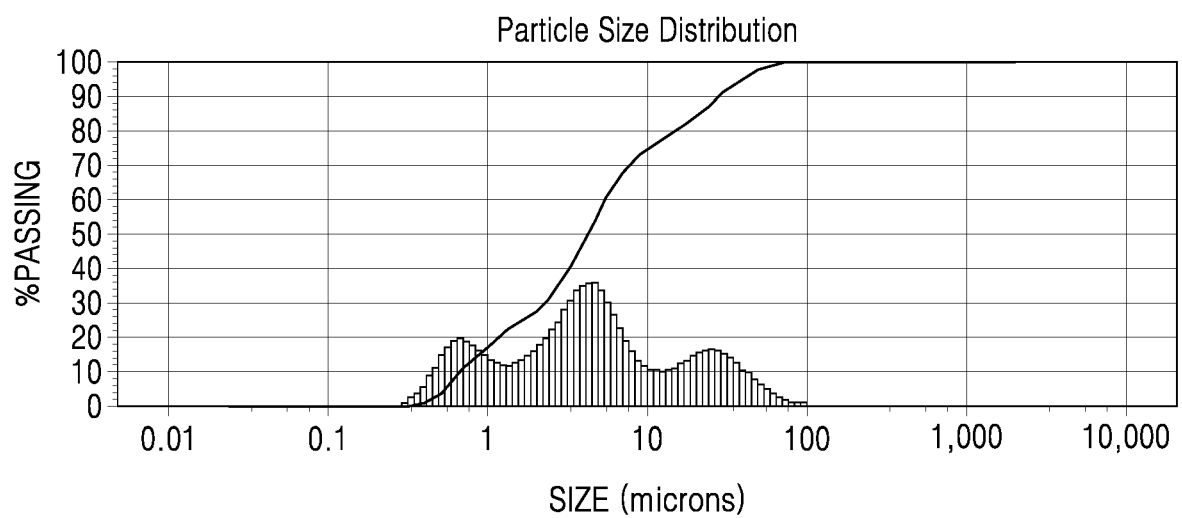
FIG. 4 is a graph showing particle size distribution of another infrared permeable ink composition according to the prior art.

In particular, it was confirmed that particles having a particle size in a range of about 0.05 μm to about 1 μm did not exist at all in FIG. 3.

Referring to FIGS. 5 to 7, it was confirmed that the number of particles having a particle size in a range of about 0.05 μm to about 1 μm in the particle distribution of the infrared permeable ink composition of each of Examples 1 to 3 reached 50% or more of the total number of the particles.

Preparation of Optical Filter

After printing on a glass film to a thickness of 3 μm by inkjet using the infrared permeable ink composition of each of the Comparative Examples 1 to 4 and Examples 1 to 3, a curing process was performed thereon at 160° C. for 2 minutes, thereby preparing an optical filter.

Measurement of Transmittance

For each of the optical filters prepared by using the infrared permeable ink compositions of Comparative Examples 1 to 4 and Examples 1 to 3, transmittance at 550 nm and 940 nm was respectively measured.

As a result, all of the optical filters prepared by using the infrared permeable ink compositions of Comparative Examples 1 to 4 showed transmittance of about 0.20% at 550 nm and about 88% at 940 nm.

Also, all of the optical filters prepared by using the infrared permeable ink compositions of Examples 1 to 3 showed transmittance of about 0.25% at 550 nm and about 88% at 940 nm.

Measurement of Roughness

For each of the optical filters prepared by using the infrared permeable ink compositions of Comparative Examples 1 to 4 and Examples 1 to 3, the roughness was measured by using an atomic force microscope (AFM/manufactured by NanoWizard Ultra Speed), and results thereof were summarized in Table 1.

TABLE 1

|  | Roughness (nm) |
| --- | --- |
| Comparative Example 1 | 10.30 |
| Comparative Example 2 | 10.23 |
| Comparative Example 3 | 10.27 |
| Comparative Example 4 | 15.03 |
| Example 1 | 5.36 |
| Example 2 | 7.16 |
| Example 3 | 6.79 |

As a result, it was confirmed that the optical filters prepared by using the infrared permeable ink compositions of Comparative Examples 1 to 4 had roughness exceeding 10 nm in both a surface of 30 μm×30 μm and a surface of 10 μm×10 μm.

Also, it was confirmed that the optical filters prepared by using the infrared permeable ink compositions of Examples 1 to 3 had roughness of less than 10 nm in both a surface of 30 μm×30 μm and a surface of 10 μm×10 μm.

Evaluation of Ethanol Robustness

Regarding the optical filters prepared by using the infrared permeable ink compositions of Comparative Examples 1 to 4, it was confirmed that, when rubbing 10 times by applying a load of 1 kg to a lint-free wiper containing ethanol (99.5%), the infrared permeable ink was melted out from all the optical filters.

Regarding the optical filters prepared by using the infrared permeable ink compositions of Examples 1 to 3, it was also confirmed that, when rubbing 10 times by applying a load of 1 kg to a lint-free wiper containing ethanol (99.5%), the infrared permeable ink was not melted out from all the optical filters.

Referring to the results above, it was confirmed that the optical filters prepared by curing the infrared permeable ink compositions according to an embodiment of the disclosure had the surface roughness of equal to or less than 10 nm, and accordingly had desired properties in terms of both transmittance and ethanol robustness.

However, it was also confirmed that the optical filters prepared by curing the infrared permeable ink compositions of Comparative Examples had the surface roughness exceeding 10 nm, and accordingly had low ethanol robustness.

Meanwhile, the optical filters prepared by curing the infrared permeable ink compositions of Comparative Examples had satisfactory transmittance.

However, when the rework of a cover glass of an electronic device (e.g., a mobile phone) is desired to be performed, the infrared permeable ink compositions may be melted out from a layer formed of the infrared permeable ink composition on the cover glass due to low ethanol robustness, and consequently, the transmittance may become outside the desired range, leading to a defect of the product.

According to the one or more embodiments, an optical filter formed by curing an infrared permeable ink composition may have surface roughness of equal to or less than about 10 nm, and thus may have improved durability.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An infrared permeable ink composition comprising an epoxy resin, a curing agent, and a dye,
wherein, in measurement of particle distribution of the infrared permeable ink composition by using a tri-laser system of Microtrac, a number of particles having a particle size in a range of about 0.05 μm to about 1 μm is equal to or greater than 50% of a total number of particles.

2. The infrared permeable ink composition of claim 1, wherein the epoxy resin is a bisphenol A-based epoxy resin.

3. The infrared permeable ink composition of claim 1, wherein a molecular weight of the epoxy resin is in a range of about 100 to about 10,000.

4. The infrared permeable ink composition of claim 1, wherein the dye comprises an azo dye, an imidazole dye, an acridine dye, or a combination thereof.

5. The infrared permeable ink composition of claim 1, wherein a surface roughness of an optical filter formed by curing the ink composition is equal to or less than about 10 nm.

6. The infrared permeable ink composition of claim 1, wherein the curing agent is a blocked isocyanate resin.

7. The infrared permeable ink composition of claim 1, wherein the curing agent comprises methylene phenyl diisocyanate, polymeric methylene phenyl diisocyanate, tolylene diisocyanate, lysine diisocyanate, hexamethylen diisocyanate, xylylene diisocyanate, 2,4,6-triisopropyl phenyldiisocyanate, isophorone diisocyanate, 4,4'-dichlohexylmethane diisocyanate, or a combination thereof.

8. The infrared permeable ink composition of claim 1, further comprising
a curing accelerator.

9. The infrared permeable ink composition of claim 8, wherein the curing accelerator is an imidazole-based compound.

10. The infrared permeable ink composition of claim 8, wherein the curing accelerator comprises 2MZ, 1.2DMZ, 2EM4Z, 2PZ, 1B2MZ, 2P4MZ, C11Z, C17Z, C11Z-A, 2MZ-A, or a combination thereof.

11. The infrared permeable ink composition of claim 1, further comprising:
an adhesion promoter.

12. The infrared permeable ink composition of claim 11, wherein the adhesion promoter is amino-based silane.

13. The infrared permeable ink composition of claim 11, wherein the adhesion promoter is aminoethyl aminopropyl triethoxysilane, n-phenylaminopropyltrimethoxysilane, trimethoxysilylpropyl diethylene triamine, 3-(3-aminophenoxy) propyl trimethoxysilane, aminoethyl aminomethyl phenyltrimethoxysilane, 2-aminoethyl-3-aminopropylsilane, tris-2-ethylhex oxysilane, n-aminohexyl aminopropyl trimethoxysilane, or a combination thereof.

14. The infrared permeable ink composition of claim 1, further comprising:
   a pigment, an antifoaming agent, a leveling agent, a dispersant, a solvent, or a combination thereof.

15. The infrared permeable ink composition of claim 1, wherein an amount of the dye is in a range of about 5 parts by weight to about 30 parts by weight based on 100 parts by weight of the epoxy resin.

16. An optical filter formed by curing the infrared permeable ink composition of claim 1.

17. The optical filter of claim 16, wherein the optical filter has transmittance of equal to or less than about 1% at 550 nm and equal to or greater than about 85% at 940 nm.

18. The optical filter of claim 16, wherein the optical filter has surface roughness of equal to or less than about 10 nm.

19. An electronic apparatus comprising an optical filter formed by curing the infrared permeable ink composition of claim 1.

20. The electronic apparatus of claim 19, further comprising:
   a proximity sensor,
   wherein the optical filter is disposed on the proximity sensor.

* * * * *